(12) United States Patent
Kast

(10) Patent No.: US 11,585,256 B2
(45) Date of Patent: Feb. 21, 2023

(54) EXHAUST GAS/REACTANT MIXING ARRANGEMENT

(71) Applicant: Purem GmbH, Neunkirchen (DE)

(72) Inventor: Peter Kast, Esslingen (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 17/690,232

(22) Filed: Mar. 9, 2022

(65) Prior Publication Data
US 2022/0290601 A1 Sep. 15, 2022

(30) Foreign Application Priority Data
Mar. 10, 2021 (DE) .................... 10 2021 105 724.8

(51) Int. Cl.
| | |
|---|---|
| *F01N 3/28* | (2006.01) |
| *B01F 25/313* | (2022.01) |
| *B01F 25/431* | (2022.01) |
| *B01F 23/213* | (2022.01) |
| *B01D 53/94* | (2006.01) |
| *F01N 3/20* | (2006.01) |

(52) U.S. Cl.
CPC ....... *F01N 3/2892* (2013.01); *B01D 53/9418* (2013.01); *B01D 53/9431* (2013.01); *B01F 23/2132* (2022.01); *B01F 25/3131* (2022.01); *B01F 25/431* (2022.01); *F01N 3/2066* (2013.01); *F01N 2610/02* (2013.01); *F01N 2610/1453* (2013.01)

(58) Field of Classification Search
CPC ......... F01N 2610/02; F01N 2610/1453; F01N 2240/20; F01N 3/2066; F01N 3/2892; F01N 3/0293; F01N 3/2821; B01D 53/9418; B01D 53/9431; B01D 25/3131; B01D 25/431; B01D 25/3141; B01D 25/4231
USPC .......................................... 60/317, 282, 299
See application file for complete search history.

(56) References Cited

U.S. PATENT DOCUMENTS

| | | | |
|---|---|---|---|
| 10,287,948 B1 * | 5/2019 | Moulieres ........... | B01F 25/4521 |
| 11,208,935 B2 * | 12/2021 | Kurpejovic ......... | B01F 25/3141 |
| 2015/0110681 A1 * | 4/2015 | Ferront ............... | B01F 23/2132 |
| | | | 422/168 |

(Continued)

FOREIGN PATENT DOCUMENTS

| | | |
|---|---|---|
| DE | 10 2019 210 877 A1 | 1/2020 |
| EP | 3 726 017 A1 | 10/2020 |

(Continued)

*Primary Examiner* — Devon C Kramer
*Assistant Examiner* — Kelsey L Stanek
(74) *Attorney, Agent, or Firm* — Walter Ottesen, P.A.

(57) ABSTRACT

An exhaust gas/reactant mixing arrangement is for an exhaust system of an internal combustion engine for mixing exhaust gas and reactant. The mixing arrangement includes an exhaust gas guide housing extending in the direction of a housing longitudinal axis and a housing wall. The housing wall surrounds and defines an exhaust gas duct accommodating a flow of exhaust gas. A mixing zone is formed between an upstream end wall and a downstream end wall arranged downstream of the upstream end wall. The mixing zone includes a first chamber and a second chamber as well as a reactant dispensing unit carried on the exhaust gas guide housing for dispensing reactant into the first chamber in a reactant main dispensing direction oriented substantially along a reactant dispensing line.

13 Claims, 2 Drawing Sheets

(56) References Cited

U.S. PATENT DOCUMENTS

| | | |
|---|---|---|
| 2017/0260888 A1* | 9/2017 | Solipuram .............. F01N 3/103 |
| 2018/0066559 A1 | 3/2018 | Haverkamp et al. |
| 2019/0010850 A1* | 1/2019 | Willats ................... F01N 3/035 |
| 2019/0211732 A1 | 7/2019 | Haverkamp et al. |
| 2020/0032692 A1* | 1/2020 | Wang ................... F01N 3/0293 |
| 2020/0131974 A1 | 4/2020 | Wang et al. |
| 2020/0330935 A1 | 10/2020 | Kurpejovic et al. |
| 2020/0347767 A1 | 11/2020 | El-Gammal et al. |
| 2020/0408131 A1 | 12/2020 | Kurpejovic et al. |
| 2021/0246820 A1 | 8/2021 | Haverkamp et al. |

FOREIGN PATENT DOCUMENTS

| | | |
|---|---|---|
| EP | 3 757 364 A1 | 12/2020 |
| WO | 2016/142417 A1 | 9/2016 |

* cited by examiner

EXHAUST GAS/REACTANT MIXING ARRANGEMENT

CROSS REFERENCE TO RELATED APPLICATION

This application claims priority of German patent application no. 10 2021 105 724.8, filed Mar. 10, 2021, the entire content of which is incorporated herein by reference.

TECHNICAL FIELD

The present disclosure relates to an exhaust gas/reactant mixing arrangement for an exhaust system of an internal combustion engine, for example in a vehicle, with which the exhaust gas emitted by the internal combustion engine can be mixed efficiently with reactant injected into the exhaust gas, for example a urea/water solution.

BACKGROUND

In order to reduce the nitrogen oxide content in exhaust gas emitted by a diesel internal combustion engine, it is known to carry out selective catalytic reduction in an SCR catalytic converter arrangement. To this end, a reactant, for example a urea/water solution, is injected into the exhaust gas upstream of the SCR catalytic converter arrangement. Before passing into the SCR catalytic converter arrangement, efficient mixing of exhaust gas and reactant has to take place. This is associated with the problem that, for example on account of condensation of the reactant, injected generally in liquid form, on an inner surface of a housing guiding the exhaust gas flow, liquid reactant can accumulate and deposits can form. Insufficient mixing of exhaust gas and reactant can also have the result that a part of the liquid reactant passes into the SCR catalytic converter arrangement and is therefore substantially not available for efficient performance of a catalytic reaction. The risk of insufficient mixing of reactant and exhaust gas primarily exists when, for a compact structure of an exhaust system, the distance between the location at which the reactant is injected for example substantially orthogonally to the exhaust gas flow and the SCR catalytic converter arrangement is relatively small in the direction of flow.

SUMMARY

An object of the present disclosure is to provide an exhaust gas/reactant mixing arrangement which, while having a compact structure, ensures efficient mixing of exhaust gas and reactant.

According to the disclosure, this object is, for example, achieved by an exhaust gas/reactant mixing arrangement for an exhaust system of an internal combustion engine for mixing exhaust gas and reactant. This exhaust gas/reactant mixing arrangement includes: an exhaust gas guide housing, extending in the direction of a housing longitudinal axis, having a housing wall, wherein an exhaust gas duct which is surrounded by the housing wall and through which exhaust gas is able to flow is formed in the exhaust gas guide housing; a mixing zone formed between an upstream end wall and a downstream end wall arranged downstream of the upstream end wall, wherein the mixing zone includes a first chamber and a second chamber; a reactant dispensing arrangement, carried on the exhaust gas guide housing, for dispensing reactant into the first chamber in a reactant main dispensing direction oriented substantially along a reactant dispensing line; at least one first inflow opening being provided in the upstream end wall, wherein, via the at least one first inflow opening, a region of the exhaust gas duct that lies upstream of the upstream end wall is open toward the first chamber, wherein at least one second inflow opening is provided in the upstream end wall, wherein, via the at least one second inflow opening, the region of the exhaust duct that lies upstream of the upstream end wall is open toward the second chamber; at least one first outflow opening being provided in the downstream end wall, wherein, via the at least one first outflow opening, the first chamber is open toward a region of the exhaust duct that lies downstream of the downstream end wall; and, at least one second outflow opening being provided in the downstream end wall, wherein, via the at least one second outflow opening, the second chamber is open toward the region of the exhaust duct that lies downstream of the downstream end wall.

As a result of the mixing zone delimited between the two end walls being subdivided into two chambers and reactant being injected into one of these two chambers, flow conditions that support mixing are created. Moreover, the geometric arrangement of the two chambers with regard to one another can ensure that the particular chamber into which the reactant is injected, that is, the first chamber, is extensively shielded toward the outside, or with regard to the housing wall, by the second chamber. The risk of condensation of reactant on a wall bounding the first chamber can be reduced as a result.

In order to separate the two chambers of the mixing zone functionally from one another, it is proposed that there is substantially no fluidic connection between the first chamber and the second chamber. It should be noted that the two chambers do not necessarily need to be separated from one another in a completely gastight manner. Gas leaks for example at the location where walls that delimit the chambers or separate them from one another or adjoin one another do not have a negative impact on the functionality of the exhaust gas/reactant mixing arrangement according to the disclosure.

If at least two first inflow openings are provided in the upstream end wall, wherein in each case at least one first inflow opening is provided on both sides of the reactant dispensing line in the circumferential direction, this ensures that a web, formed between the first inflow openings, in the first end wall shields the reactant flow injected into the first chamber against direct incident flow with exhaust gas, such that the reactant flow can be introduced into the first chamber in a defined manner.

For uniform mixing of exhaust gas and reactant over the cross section of the exhaust gas/reactant mixing arrangement, it is proposed that the first inflow openings provided on both sides of the reactant dispensing line in the circumferential direction are arranged substantially mirror-symmetrically to a plane containing the reactant dispensing line and the housing longitudinal axis.

For uniform dispensing of the mixture of exhaust gas and reactant into the exhaust gas duct, at least two first outflow openings may be provided in the downstream end wall, wherein in each case at least one first outflow opening is provided on both sides of the reactant dispensing line in the circumferential direction.

Here too, it is advantageous for the first outflow openings provided on both sides of the reactant dispensing line in the circumferential direction to be arranged substantially mirror-symmetrically to the plane containing the reactant dispensing line and the housing longitudinal axis.

In order to prevent exhaust gas from passing directly through the mixing zone in the direction of the housing longitudinal axis, provision can be made that, on at least one, preferably each side of the reactant dispensing line in the circumferential direction, the first inflow openings are arranged closer to the reactant dispensing line than the first outflow openings, and/or that, on at least one, preferably each side of the reactant dispensing line in the circumferential direction, in each case one baffle extending between the upstream end wall and the downstream end wall and preferably adjoining the housing wall is arranged between the first inflow openings and the first outflow openings.

For efficient mixing of exhaust gas and reactant in the first chamber, a first chamber region, narrowing in the reactant main dispensing direction, of the first chamber may be formed between the baffles arranged on both sides of the reactant dispensing line in the circumferential direction, wherein the first chamber region is open toward a second chamber region of the first chamber at a transition opening, wherein the second chamber region, starting from the transition opening between the first chamber region and the second chamber region, leads on both sides of the reactant dispensing line to the first outflow openings.

If the first chamber region and/or the second chamber region is/are arranged substantially mirror-symmetrically to the plane containing the reactant dispensing line and the housing longitudinal axis, a uniform mixing characteristic over the cross section of the mixing zone is supported.

In order to separate the two chambers of the mixing zone from one another, a partition wall that separates the first chamber from the second chamber and extends between the upstream end wall and the downstream end wall may be provided. In order in this case for the first chamber to be thermally shielded from the outside by the second chamber, it is particularly advantageous for the partition wall to delimit the first chamber radially on the outside with respect to the second chamber.

For example, the partition wall may extend between the baffles substantially in the circumferential direction along the housing wall, such that the two baffles also support the separation of the two chambers of the mixing zone from one another or delimit the second chamber in the circumferential direction. In this case, the partition wall may be arranged substantially mirror-symmetrically to the plane containing the reactant dispensing line and the housing longitudinal axis.

For dispensing exhaust gas from the second chamber, in the downstream end wall, a respective group, preferably with a plurality of second outflow openings that follow one another substantially in the circumferential direction, may be provided in each chamber end region, adjoining one of the baffles, of the second chamber.

Here too, a uniform mixing characteristic over the cross section is supported if the groups of second outflow openings provided in the two chamber end regions of the second chamber are arranged substantially mirror-symmetrically to the plane containing the reactant dispensing line and the housing longitudinal axis.

To support the evaporation of reactant in the first chamber, the second inflow opening may be arranged between the partition wall and the housing wall, and the partition wall may be concavely shaped toward the first chamber in the region of the second inflow opening.

Here too, it is advantageous for the second inflow opening to be arranged substantially mirror-symmetrically to the plane containing the reactant dispensing line and the housing longitudinal axis, and/or for the upstream end wall and/or the downstream end wall to be formed substantially mirror-symmetrically to the plane containing the reactant dispensing line and the housing longitudinal axis.

The reactant dispensing line may extend substantially orthogonally to the housing longitudinal axis, wherein, for example in the case of a tubular configuration of the exhaust gas guide housing, the housing longitudinal axis may be a rectilinearly extending line.

The disclosure also relates to an exhaust system for an internal combustion engine, including an exhaust gas/reactant mixing arrangement constructed according to the disclosure and an SCR catalytic converter arrangement downstream of the exhaust gas/reactant mixing arrangement.

BRIEF DESCRIPTION OF THE DRAWINGS

The invention will now be described with reference to the drawings wherein.

DESCRIPTION OF THE PREFERRED EMBODIMENTS

Figure 1:
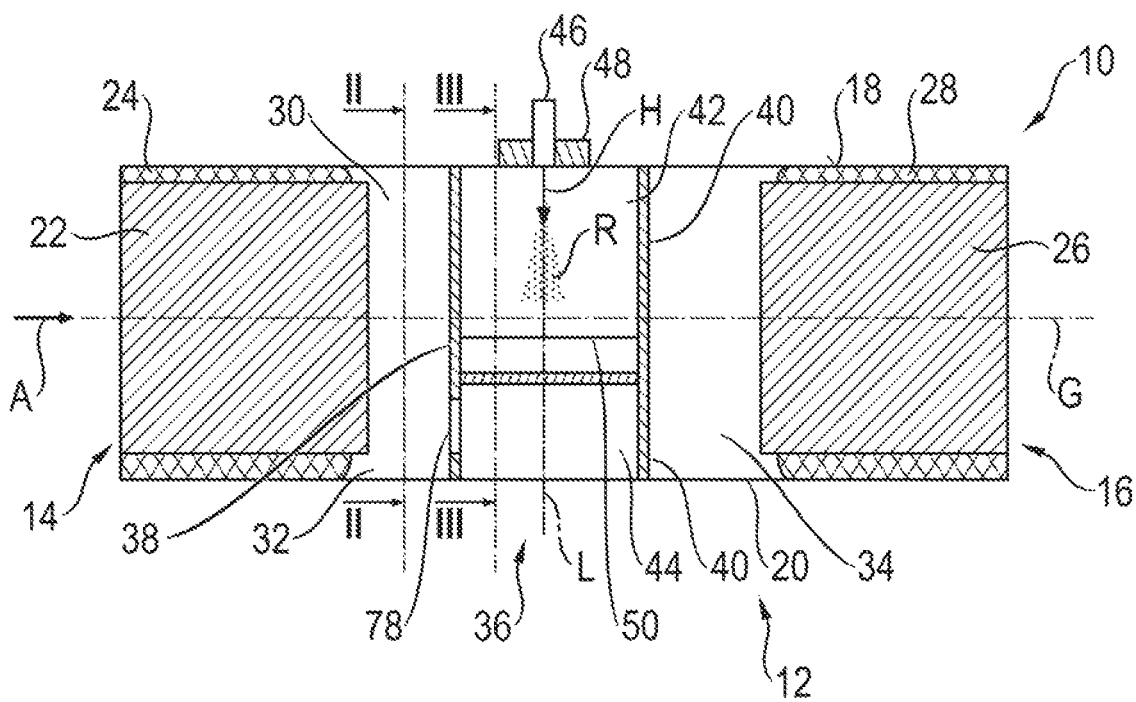
FIG. 1 shows a basic view in longitudinal section of an exhaust system having an exhaust gas/reactant mixing arrangement.

FIG. 1 illustrates a portion of an exhaust system, denoted generally by 10, of an internal combustion engine for example in a vehicle. This exhaust system 10 includes, as its central constituent, an exhaust gas/reactant mixing arrangement 12, which may be arranged in the exhaust system 10 for example downstream of a particle filter arrangement 14 and upstream of an SCR catalytic converter arrangement 16.

The exhaust gas/reactant mixing arrangement 12 includes a for example tubular exhaust gas guide housing 18 that is elongate in the direction of a housing longitudinal axis G and has a substantially cylindrical housing wall 20 formed for example with a circular cross section. The particle filter arrangement 14 can be carried upstream of the exhaust gas/reactant mixing arrangement 12 in this exhaust gas guide housing 18. For example, the particle filter arrangement 14 may include a particle filter block 22 of monolithic construction, which is carried, wrapped in a fiber mat 24 or the like, in the exhaust gas guide housing 18. The SCR catalytic converter arrangement 16 arranged downstream of the exhaust gas/reactant mixing arrangement 12 may also be carried in the exhaust gas guide housing 18 and may include a catalytic converter block 26 of monolithic construction, which may be carried by a fiber mat 28 or the like, surrounding it, in the exhaust gas guide housing 18.

It should be noted that the exhaust system 10, or the exhaust gas guide housing 18, may be subdivided into a plurality of segments that follow one another in an exhaust gas main direction of flow A and are, for example, connected together, of which, for example, one of the segments may contain the particle filter arrangement 14, one of the segments may contain or provide the exhaust gas/reactant mixing arrangement 12 described in detail below, and one of the segments may contain the SCR catalytic converter arrangement 16.

Formed in the exhaust gas guide housing 18 is an exhaust gas duct 30 through which exhaust gas is able to flow substantially in the exhaust gas main direction of flow, wherein the duct 30 has a duct region 32 that lies upstream of the exhaust gas/reactant mixing arrangement 12 and a duct region 34 that lies downstream of the exhaust gas/reactant mixing arrangement 12.

Figure 2:
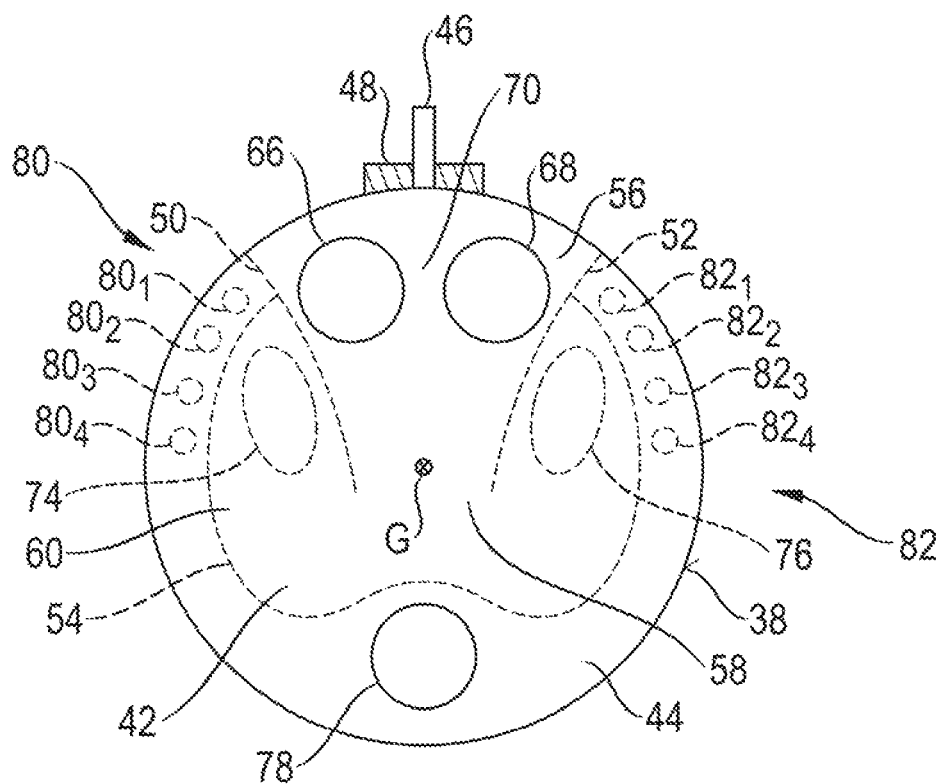
FIG. 2 shows a view in cross section of the exhaust system from FIG. 1, taken along a line II-II in FIG. 1; and, FIG. 3 shows a view in cross section of the exhaust system from FIG. 1, taken along a line III-III in FIG. 1.
Figure 3:
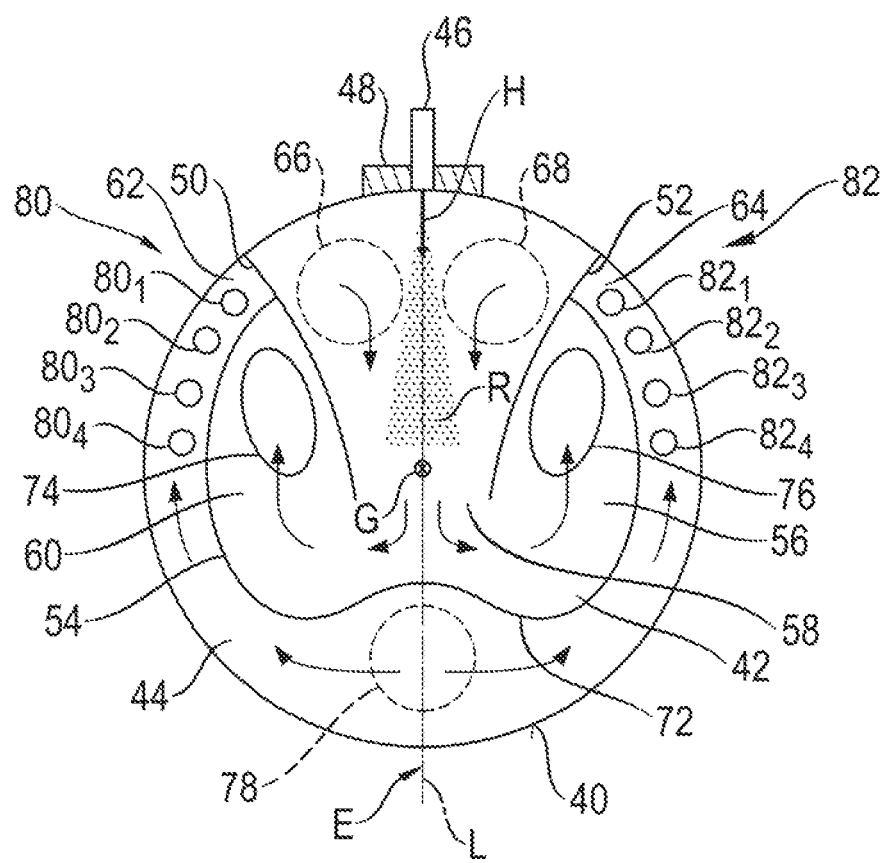

FIG. 2 shows an upstream end wall 38 delimiting a mixing zone 36 in the upstream direction, that is, toward the duct region 32, as seen in the exhaust gas main direction of flow A. Similarly, FIG. 3 shows a downstream end wall 40, seen in the exhaust gas main direction of flow A, which delimits the mixing zone 36 in the downstream direction, that is, toward the duct region 34 and is offset in the downstream direction with respect to the upstream end wall 38 along the housing longitudinal axis G.

In the direction of the housing longitudinal axis G, two chambers 42, 44 of the mixing zone 36 are formed between the two end walls 38, 40. Furthermore, assigned to the mixing zone 36 there is provided a reactant dispensing arrangement 46, also referred to generally as an injector, which is carried for example by a support 48 on the housing wall 20 of the exhaust gas guide housing 18 and is configured to dispense a reactant R for example in the form of a spray cone into the mixing zone 36 in a reactant main dispensing direction H. In this case, the reactant main dispensing direction H may be oriented along a reactant dispensing line L, which may be arranged orthogonally with respect to the housing longitudinal axis G and may define with the latter for example a plane that corresponds to the drawing plane of FIG. 1. The reactant main dispensing direction H may correspond for example to the centerline of a spray cone, dispensed by the reactant dispensing arrangement 46, of the reactant R.

It should be noted that the different directions or lines discussed above do not necessarily have to be arranged exactly orthogonally to one another or to correspond to one another. Thus, it is possible for example for the reactant dispensing arrangement 46 to be carried on the exhaust gas guide housing 18 such that, for example, the reactant main dispensing direction H is oriented, in the drawing plane of FIG. 1, so as to be positioned, with respect to the illustrated orientation substantially orthogonal to the housing longitudinal axis G, counter to the exhaust gas main direction of flow A or in the exhaust gas main direction of flow A. An orientation out of the drawing plane is also possible in principle. The reactant dispensing line L may in this case be considered in principle to be a line which connects the location at which the reactant R is injected into the mixing zone 36 in the region of the housing wall 20 to the housing longitudinal axis G.

The two chambers 42, 44 of the mixing zone 36 are separated from one another between the two end walls 38, 40 by two baffles 50, 52 and a partition wall 54. The baffles 50, 52 and the partition wall 54 extend substantially in the direction of the housing longitudinal axis G between the end walls 38, 40 and may butt against the latter or be connected thereto for example by welding or soldering.

The two baffles 50, 52 extend on both sides of the reactant dispensing line L and thus also on both sides of the reactant dispensing arrangement 46 substantially mirror-symmetrically to one another with respect to a plane E defined by the reactant dispensing line L and the housing longitudinal axis G and orthogonal to the drawing plane of FIG. 3, and extend, starting from the housing wall 20, toward one another so as to form a funnel-like shape of a first chamber region 56 of the first chamber 42 and end in the region of the transition opening 58. In the region of this transition opening 58, the first chamber region 56 transitions into a second chamber region 60 of the first chamber 42. Like the first chamber region 56, the second chamber region 60 is also configured substantially mirror-symmetrically to the plane E and leads in the circumferential direction, on both sides of the reactant dispensing line L, away from the reactant dispensing line L along the partition wall 54.

The partition wall 54 separates the first chamber 42, in particular the second chamber region 60 of the first chamber 42, from the second chamber 44 surrounding the first chamber 42 radially on the outside extensively in the circumferential direction. The second chamber 44 extends, starting from the reactant dispensing line L or the plane E, substantially mirror-symmetrically to the latter, in each case toward chamber end regions 62, 64 where the second chamber 44 is delimited in the circumferential direction by the baffles 50, 52 adjoining the housing wall 20 and thus also with respect to the first chamber region 56 of the first chamber 42. Thus, the first chamber 42 is extensively surrounded radially on the outside by the second chamber 44 and thermally shielded toward the outside thereby.

First inflow openings 66, 68 are arranged in the upstream end wall 38, eccentrically to the housing longitudinal axis G, in a region located close to the reactant dispensing arrangement 46, on both sides of the reactant dispensing line L or the plane E also defined thereby. Through the first inflow openings 66, 68, the exhaust gas flow arriving substantially in the exhaust gas main direction of flow A and also from the particle filter arrangement 14 passes out of the duct region 32 into the first chamber 42, in particular the first chamber region 56 thereof. The two first inflow openings 66, 68 are positioned such that a web 70, formed therebetween, of the upstream end wall 38 covers the flow of reactant R dispensed by the reactant dispensing arrangement 46 or shields it against the exhaust gas flow. The exhaust gas thus enters the first chamber region 56 on both sides of the reactant flow or of the spray cone dispensed by the reactant dispensing arrangement 46 and is already mixed with the reactant R in the first chamber region 56. The exhaust gas and the reactant R then flow onward through the transition opening 58 into the second chamber region 60. Located opposite the transition opening 58 is a curved region 72, concavely shaped in the direction of the first chamber region 56, of the partition wall 54. This curved region 72 deflects the flow of exhaust gas and reactant R toward both sides with respect to the reactant dispensing line L or the plane E and into the portions of the second chamber region 60 that extend on both sides of the plane E.

In the regions covering these portions, the downstream end wall 40 has respective first outflow openings 74 and 76, respectively, on both sides of the reactant dispensing line L or the plane E. Through these first outflow openings 74, 76, the mixture, formed in the first chamber 42, of exhaust gas and reactant R flows out of the mixing zone 36 and into the duct region 34 of the exhaust gas duct 30 downstream of the mixing zone 36 and upstream of the SCR catalytic converter arrangement 16.

Furthermore, in the upstream end wall 38, a second inflow opening 78 is formed eccentrically to the housing longitudinal axis G and for example opposite the two first inflow openings 66, 68 with respect to the housing longitudinal axis G. The second inflow opening 78 lies substantially in a region between the housing wall 20 and the curved region 72 of the partition wall 54, such that, in this curved region 72, the partition wall 54 extends so as to partially surround the inflow opening 78. This ensures that exhaust gas entering the second chamber 44 in the region of the second inflow opening 78 heats up the partition wall 54 in particular in that region in which the mixture of exhaust gas and reactant R leaving the first chamber region 56 impinges on the partition wall 54. As a result, the evaporation of droplets, carried along in the exhaust gas, of reactant R when impinging on the partition wall 54 in the curved region 72 and thus improved mixing of exhaust gas and reactant R is supported.

The second chamber 44 extends, starting from the second inflow opening 78, in both circumferential directions along the housing wall 20 or the partition wall 54 to the chamber end regions 62, 64 and thus adopts the configuration, discussed above, extensively shielding the first chamber 42 radially toward the outside. In the region of the chamber end regions 62, 64, two groups 80, 82 each having a plurality of second outflow openings $80_1$, $80_2$, $80_3$, $80_4$ and $82_1$, $82_2$, $82_3$, $82_4$, respectively, are formed in the downstream end wall 40. Through these second outflow openings $80_1$, $80_2$, $80_3$, $80_4$ and $82_1$, $82_2$, $82_3$, $82_4$, respectively, that follow one another approximately in the circumferential direction, the exhaust gas entering the second chamber 44 through the second inflow opening 78 leaves the second chamber 44 in the direction of the duct region 34 and is mixed there with the mixture of exhaust gas and reactant R likewise flowing into the duct region 34 through the first outflow openings 74, 76.

With the above-described configuration of the mixing zone 36 in the exhaust gas/reactant mixing arrangement 12, with a configuration that is axially compact, that is, compact in the direction of the housing longitudinal axis G or the exhaust gas main direction of flow A, efficient mixing of exhaust gas and reactant R is achieved, wherein, as a result of the arrangement of the two chambers 42, 44 of the mixing zone 36 with respect to one another, the particular region into which the reactant R is injected is efficiently shielded toward the outside by that part of the exhaust gas flowing in the exhaust gas duct 30 that flows through the second chamber 44. Thus, the risk of reactant R condensing on the partition wall 54 and also on the baffles 50, 52, especially when the ambient temperature is relatively low, and forming deposits is considerably reduced. At the same time, as a result of the deflection of the exhaust gas flow in the first chamber 42 when it enters the latter through the first inflow openings 66, 68, when it flows through the transition opening 58, when it flows along the second chamber region 60 and when it exits through the first outflow openings 74, 76 and the swirling that arises in the process, efficient mixing of the exhaust gas with the reactant R injected into it is forced. This mixing is supported in that the configuration of the mixing zone 36, and of the two end walls 38, 40 and of the baffles 50, 52, and also of the partition wall 54 is formed substantially mirror-symmetrically to the reactant dispensing line L or the plane E also defined thereby. As a result, especially at low ambient temperatures, improved exhaust gas cleaning is achieved in the SCR catalytic converter arrangement 16 during a cold start and at low load points, in which, in particular at the start of combustion operation of an internal combustion engine, the exhaust gas flow emitted thereby also still exhibits a relatively low temperature.

Lastly, it should be noted that the principles of the present disclosure can, of course, also be applied in the event of a departure from the principles illustrated with reference to FIGS. 1 to 3 in different areas. Thus, for example, assigned to the first chamber 42, on both sides of the reactant dispensing line L, in each case more than one first inlet opening may be provided, wherein, in this case too, preferably a symmetric arrangement with respect to the reactant dispensing line L is chosen. The same also applies for the first outflow openings 74, 76 leading out of the first chamber 42. Likewise, the number of second outflow openings in the two groups 80, 82 may differ from the illustrated number. For example, one or each of these groups may also have only a single second outflow opening. Instead of the single second inflow opening 78 arranged substantially mirror-symmetrically to the reactant dispensing line L, a plurality of second inflow openings arranged for example mirror-symmetrically to the reactant dispensing line L or to the plane E could also be provided.

It should furthermore be noted that the above-described configuration principles may advantageously be applied especially when the mixing zone 36 or the exhaust gas guide housing 18 has the circular outer circumferential contour illustrated in the figures. In principle, the mixing zone 36 or the exhaust gas guide housing 18 could, however, also have a different, for example flattened round cross-sectional geometry, for example an elliptical cross-sectional geometry, wherein a substantially symmetric configuration may then likewise be provided with respect to a reactant dispensing line corresponding for example to the minor semi-axis of an elliptical contour. Deviations from an exact symmetric structure are also possible, for example in that the openings that are arranged on both sides of the reactant dispensing line L but have mutually corresponding openings have different shapes and/or sizes, or different spacings from the reactant dispensing line L or from the plane E.

The different walls forming the mixing zone 36, that is, the two end walls 38, 40 and the baffles 50, 52 and also the partition wall 54, may, where they butt against one another, be firmly connected together for example by being soldered or welded at points or along the entire contact region. Likewise, the baffles 50, 52, where they adjoin the housing wall 20, may be connected to the latter at points or along the entire contact region by being soldered or welded, such that the two chambers 42, 44 are separated substantially from one another in terms of flow. Fully gastight separation of these two chambers 42, 44 is not absolutely necessary, however, although this may be advantageous to avoid reactant R passing into the second chamber 44.

It is understood that the foregoing description is that of the preferred embodiments of the invention and that various changes and modifications may be made thereto without departing from the spirit and scope of the invention as defined in the appended claims.

What is claimed is:

1. An exhaust gas/reactant mixing arrangement for an exhaust system of an internal combustion engine for mixing exhaust gas and reactant, the exhaust gas/reactant mixing arrangement comprising:
   an exhaust gas guide housing defining a housing longitudinal axis (G) and extending therealong;
   said exhaust gas guide housing including a housing wall surrounding and defining an exhaust gas duct accommodating a flow of exhaust gas therethrough;
   an upstream end wall and a downstream end wall arranged downstream of said upstream end wall;
   a mixing zone formed between said upstream end wall and said downstream end wall;
   said mixing zone including a first chamber and a second chamber;
   a reactant dispensing arrangement supported on said exhaust gas guide housing and being configured to disperse reactant (R) into said first chamber in a main dispensing direction (H) oriented along a reactant dispensing line (L);
   said exhaust gas duct defining an upstream duct region upstream of said upstream end wall;
   said upstream end wall having at least two first inflow openings provided therein to open said upstream duct region to said first chamber, said at least two first inflow openings being provided in said upstream end wall on respective sides of said reactant dispensing line (L), when viewed in a circumferential direction, and being arranged mirror-symmetrically to a plane (E) conjointly defined by said reactant dispensing line (L) and said housing longitudinal axis (G);

said upstream end wall having at least one second inflow opening provided therein to open said upstream duct region to said second chamber;

said exhaust gas duct defining a downstream duct region downstream of said downstream end wall;

said downstream end wall having at least two first outflow openings provided therein to open said first chamber to said downstream duct region, said at least two first outflow openings being arranged on respective sides of said reactant dispensing line (L), when viewed in said circumferential direction, and being arranged mirror-symmetrically to said plane (E);

said downstream end wall having at least one second outflow opening provided therein to open said second chamber to said downstream duct region;

first and second baffles arranged between said first inflow openings and said first outflow openings and extending between said upstream and downstream end walls and adjoining said housing wall and being on respective sides of said reactant dispensing line (L), when viewed in said circumferential direction; and wherein said first chamber has a first chamber region formed between said first and second baffles and configured to narrow in a reactant main dispensing direction (H), said first chamber further having a second chamber region, said first chamber region being open to said second chamber region, said first and second chamber regions conjointly defining a transition opening whereat said first chamber region is open toward said second chamber region, said second chamber region being configured to start from said transition opening and to lead on both sides of said reactant dispensing line (L) to said first outflow openings.

2. The exhaust gas/reactant mixing arrangement of claim 1, wherein said first and second chambers are configured so as to permit no fluid connection therebetween.

3. The exhaust gas/reactant mixing arrangement of claim 1, wherein:
on respective sides of said reactant dispensing line (L), said first inflow openings are arranged closer to said reactant dispensing line (L) than are said first outflow openings, when viewed in said circumferential direction.

4. The exhaust gas/reactant mixing arrangement of claim 1, wherein at least one of said first and second chamber regions is arranged mirror-symmetrically to said plane (E).

5. The exhaust gas/reactant mixing arrangement of claim 1, further comprising a partition wall separating said first chamber from said second chamber and extending between said upstream end wall and said downstream end wall.

6. The exhaust gas/reactant mixing arrangement of claim 5, wherein said partition wall is configured to delimit said first chamber radially on the outside thereof with respect to said second chamber.

7. The exhaust gas/reactant mixing arrangement of claim 6, wherein said second inflow opening is arranged between said partition wall and said housing wall; and, said partition wall is concavely-shaped toward said first chamber in the region thereof extending along said second inflow opening.

8. The exhaust gas/reactant mixing arrangement of claim 5, wherein at least one of the following applies:
a) said partition wall extends between said first and second baffles in the circumferential direction along said housing wall; and,
b) said partition wall is arranged mirror-symmetrically to said plane (E).

9. The exhaust gas/reactant mixing arrangement of claim 8, wherein respective pluralities of said second outflow openings are provided in said downstream end wall in each chamber end region of said second chamber and adjoining one of said baffles and arranged so as to follow one another in said circumferential direction.

10. The exhaust gas/reactant mixing arrangement of claim 9, wherein said respective pluralities of said second outflow openings are arranged mirror-symmetrically to said plane (E).

11. The exhaust gas/reactant mixing arrangement of claim 1, wherein at least one of the following applies:
a) said second inflow opening is arranged mirror-symmetrically to said plane (E);
b) said upstream end wall is formed mirror-symmetrically to said plane (E);
c) said downstream end wall is formed mirror-symmetrically to said plane (E); and,
d) said reactant dispensing line (L) extends orthogonally to said housing longitudinal axis (G).

12. An exhaust system for an internal combustion engine, the exhaust system comprising:
an exhaust gas/reactant mixing arrangement including:
an exhaust gas guide housing defining a housing longitudinal axis (G) and extending therealong;
said exhaust gas guide housing including a housing wall surrounding and defining an exhaust gas duct accommodating a flow of exhaust gas therethrough;
an upstream end wall and a downstream end wall arranged downstream of said upstream end wall;
a mixing zone formed between said upstream end wall and said downstream end wall;
said mixing zone including a first chamber and a second chamber;
a reactant dispensing arrangement supported on said exhaust gas guide housing and being configured to disperse reactant (R) into said first chamber in a main dispensing direction (H) oriented along a reactant dispensing line (L);
said exhaust gas duct defining an upstream duct region upstream of said upstream end wall;
said upstream end wall having at least two first inflow openings provided therein to open said upstream duct region to said first chamber, said at least two first inflow openings being provided in said upstream end wall on respective sides of said reactant dispensing line (L), when viewed in a circumferential direction, and being arranged mirror-symmetrically to a plane (E) conjointly defined by said reactant dispensing line (L) and said housing longitudinal axis (G);
said upstream end wall having at least one second inflow opening provided therein to open said upstream duct region to said second chamber;
said exhaust gas duct defining a downstream duct region downstream of said downstream end wall;
said downstream end wall having at least two first outflow openings provided therein to open said first chamber to said downstream duct region, said at least two first outflow openings being arranged on respective sides of said reactant dispensing line (L), when viewed in said circumferential direction, and being arranged mirror-symmetrically to said plane (E);

said downstream end wall having at least one second outflow opening provided therein to open said second chamber to said downstream duct region;

first and second baffles arranged between said first inflow openings and said first outflow openings and extending between said upstream and downstream end walls and adjoining said housing wall and being on respective sides of said reactant dispensing line (L), when viewed in said circumferential direction;

an SCR catalytic converter arrangement being disposed downstream of said exhaust gas/reactant mixing arrangement; and wherein at least one of the following applies:

said first chamber has a first chamber region formed between said first and second baffles and configured to narrow in a reactant main dispensing direction (H), said first chamber further having a second chamber region, said first chamber region being open to said second chamber region, said first and second chamber regions conjointly defining a transition opening whereat said first chamber region is open toward said second chamber region, said second chamber region being configured to start from said transition opening and to lead on both sides of said reactant dispensing line (L) to said first outflow openings;

and a partition wall separating said first chamber from said second chamber extends between said upstream end wall and said downstream end wall and extends between said first and second baffles in said circumferential direction along said housing wall, said second chamber, in association with each baffle of said first and second baffles, having a respective chamber end region adjoining one of said baffles, respective pluralities of said second outflow openings provided in said downstream end wall being arranged in each chamber end region so as to follow one another in a circumferential direction.

13. An exhaust gas/reactant mixing arrangement for an exhaust system of an internal combustion engine for mixing exhaust gas and reactant, the exhaust gas/reactant mixing arrangement comprising:

an exhaust gas guide housing defining a housing longitudinal axis (G) and extending therealong;

said exhaust gas guide housing including a housing wall surrounding and defining an exhaust gas duct accommodating a flow of exhaust gas therethrough;

an upstream end wall and a downstream end wall arranged downstream of said upstream end wall;

a mixing zone formed between said upstream end wall and said downstream end wall;

said mixing zone including a first chamber and a second chamber;

a reactant dispensing arrangement supported on said exhaust gas guide housing and being configured to disperse reactant (R) into said first chamber in a main dispensing direction (H) oriented substantially along a reactant dispensing line (L);

said exhaust gas duct defining an upstream duct region upstream of said upstream end wall;

said upstream end wall having at least two first inflow openings provided therein to open said upstream duct region to said first chamber, said at least two first inflow openings being provided in said upstream end wall on respective sides of said reactant dispensing line (L), when viewed in a circumferential direction, and being arranged mirror-symmetrically to a plane (E) conjointly defined by said reactant dispensing line (L) and said housing longitudinal axis (G);

said upstream end wall having at least one second inflow opening provided therein to open said upstream duct region to said second chamber;

said exhaust gas duct defining a downstream duct region downstream of said downstream end wall;

said downstream end wall having at least two first outflow openings provided therein to open said first chamber to said downstream duct region, said at least two first outflow openings being arranged on respective sides of said reactant dispensing line (L), when viewed in said circumferential direction, and being arranged mirror-symmetrically to said plane (E);

said downstream end wall having at least one second outflow opening provided therein to open said second chamber to said downstream duct region;

first and second baffles arranged between said first inflow openings and said first outflow openings and extending between said upstream and downstream end walls and adjoining said housing wall and being on respective sides of said reactant dispensing line (L), when viewed in said circumferential direction; and, a partition wall separating said first chamber from said second chamber and extending between said upstream end wall and said downstream end wall and extending between said first and second baffles in said circumferential direction along said housing wall; and wherein said second chamber, in association with each baffle of said first and second baffles, has a respective chamber end region adjoining one of said baffles, respective pluralities of said second outflow openings provided in said downstream end wall being arranged in each chamber end region so as to follow one another in a circumferential direction.

* * * * *